C. M. CORBETT.
LOCKING DEVICE.
APPLICATION FILED AUG. 8, 1921.

1,423,194.   Patented July 18, 1922.

Claude M Corbett
Inventor

UNITED STATES PATENT OFFICE.

CLAUDE M. CORBETT, OF PORT ARTHUR, TEXAS.

LOCKING DEVICE.

1,423,194.

Specification of Letters Patent. Patented July 18, 1922.

Application filed August 8, 1921. Serial No. 490,625.

*To all whom it may concern:*

Be it known that I, CLAUDE M. CORBETT, a citizen of the United States, residing at Port Arthur, county of Jefferson, and State of Texas, have invented certain new and useful Improvements in Locking Devices, of which the following is a specification.

This invention relates to a lock for locking a spare tire in position and contemplates mechanism for preventing the removal of the tire from the tire carrier when the device is in locked position.

The primary object of the invention is to provide means for preventing the rotation of the nut on the bolt commonly employed for securing the locking lugs which hold the tire on the carrier and in pursuance of this object the invention includes means for so engaging the nut that it cannot be rotated while the device is in operative position.

A further object is to provide a projection on the body which is adapted to engage the hole in the lug on the rim of the carrier thus preventing the device from being moved out of proper locking position.

Other objects as well as the particular advantages of my invention will be apparent from the following detailed description thereof, reference being had to the accompanying drawings in which:—

Figure 1:
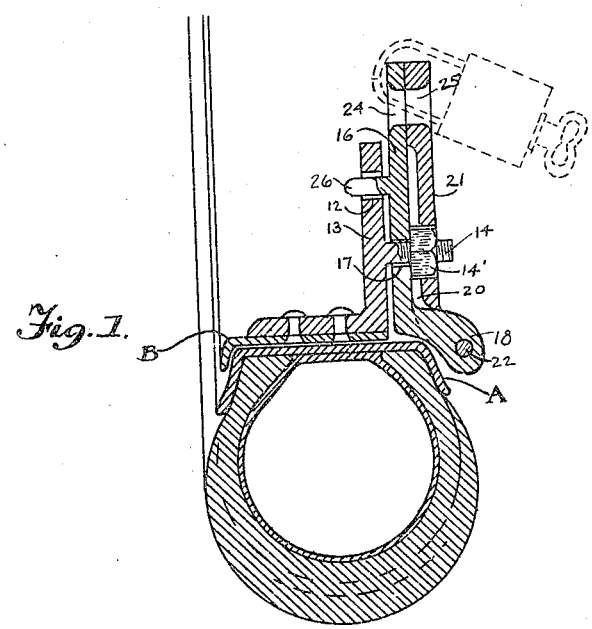
Figure 1 is a fragmentary section showing in operative position a device constructed in accordance with the invention and constituting an embodiment thereof.
Figure 2:
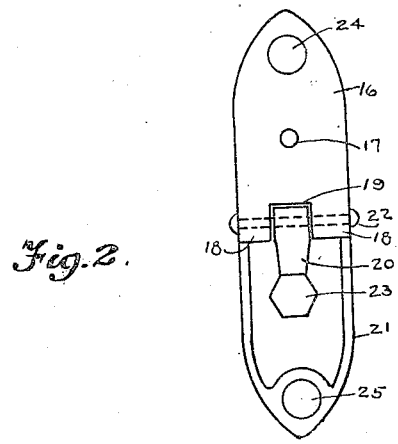
Figure 2 is a front view with the hasp in open position.

Referring now to the drawings it will be seen that the device which constitutes the subject matter of my invention includes a body member 16 suitably attached to which is a movable plate or hasp 21. The body is preferably constructed with a pair of ears 18 forming a recess 19 for a lug 20 of the plate 21. The plate is connected to the body in any suitable manner, as by means of a pin 22 by which the plate is hingedly joined to the body 16. The ends of the pin 22 are preferably welded or enlarged to prevent removal of same from the device.

The plate or hasp 21 is provided with a recess 23 preferably hexagonal in form and adapted to engage the nut 14' and prevent its rotation. If desired the hole 23 may have as one of its sides one end of the lug member 20.

A hole 24 in the body 16 is arranged to coincide with a hole 25 in the cover 21 when the apparatus is in closed position so that a padlock may be inserted in the holes for the purpose of locking the mechanism. A lug or projection 26 formed in the body 16 is arranged to engage in the hole 12 of the member 13 which carries the locking bolt 14. The projection when so engaged prevents the locking device from being moved out of its correct closed position.

As clearly shown in Figure 1, after the tire with its rim A is placed on the supporting rim B the body is put in position over the bolt 14 with the projection 26 engaging in the hole 12 in the member 13 clamping same to member 13. The ears engage the tire rim A and hold it upon the carrier rim B. The hasp 21 is then closed and a lock passed through the holes 24 and 25 thereby locking the cover plate to the body. The sides of the recess 23 engage the nut 14' and thus prevent it from being rotated.

While the drawings show the device adapted to be locked by a padlock it is to be understood that any suitable form of lock may be provided for locking the plate to the body.

A device of preferred form and construction has been illustrated and described for the purpose of showing a way in which this invention may be used, but the inventive thought upon which the application is based, is broader than this illustrative embodiment thereof, and I therefore intend no limitations other than those imposed by the appended claims.

What I claim is:

1. A device of the character described comprising a body having an opening therein for receiving the bolt of a tire carrier, a projection on the body for engaging a hole in the tire carrier, a hasp connected to the body, means in connection with said hasp for preventing the rotation of the nut on said bolt and means for locking the hasp in closed position.

2. A device of the character described comprising a body having an opening therein for receiving the bolt of a tire carrier, a lug on the body adapted to engage the tire carrier, a hasp connected to the body, means in connection with said hasp for preventing the rotation of the nut on said bolt and means for locking the hasp in closed position.

In witness whereof I have hereunto set my hand and seal this 4th day of August 1921.

CLAUDE M. CORBETT.